Sept. 18, 1928. 1,684,896
F. STEBLER
FRUIT SCRUBBER
Filed Jan. 31, 1927 2 Sheets-Sheet 1
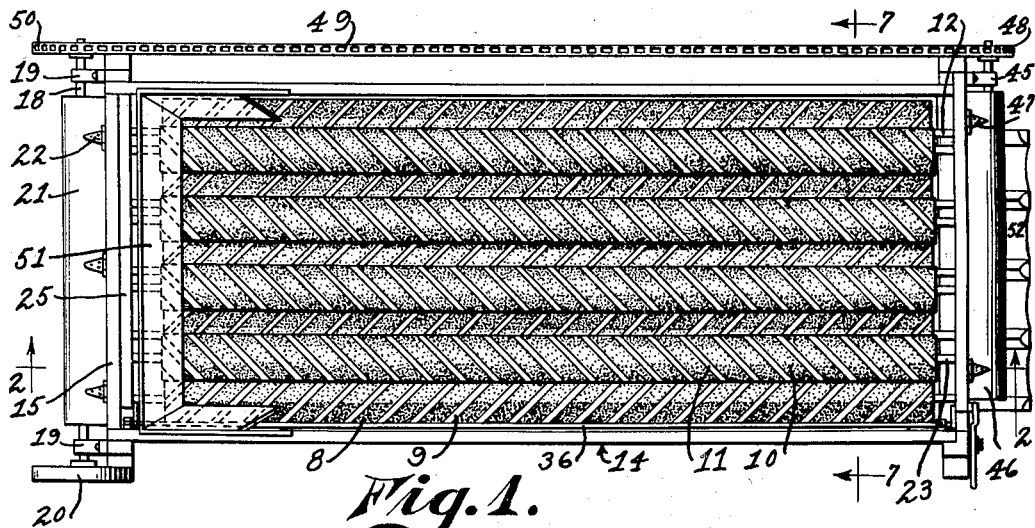
Fig. 1.
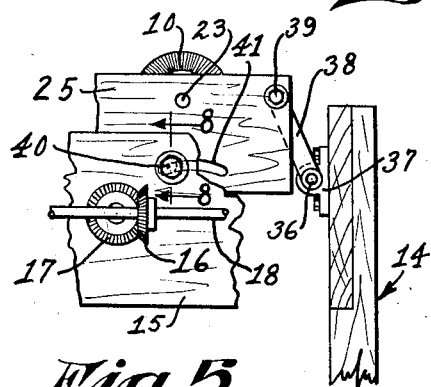
Fig. 5.
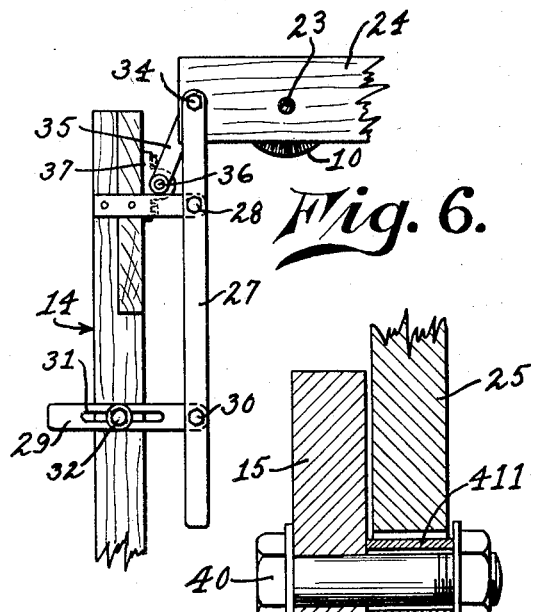
Fig. 6.
Fig. 8.
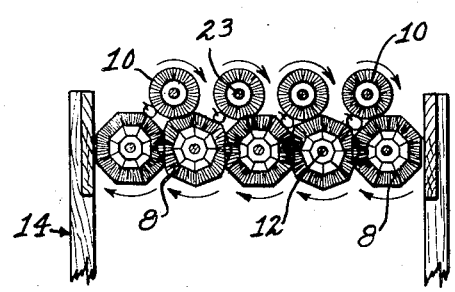
Fig. 7.
Inventor
Fred Stebler
By Lyon & Lyon
Attorneys Sept. 18, 1928.  
F. STEBLER  
FRUIT SCRUBBER  
Filed Jan. 31, 1927    2 Sheets-Sheet 2

1,684,896

Inventor  
Fred Stebler

By Lyon & Lyon  
Attorneys

Patented Sept. 18, 1928.

1,684,896

UNITED STATES PATENT OFFICE.

FRED STEBLER, OF RIVERSIDE, CALIFORNIA.

FRUIT SCRUBBER.

Application filed January 31, 1927. Serial No. 164,687.

This invention relates to fruit scrubbers and an important object of the invention is to increase the efficiency of machines of this type.

Another important object is to insure against piling up of the fruit at one side of the scrubber and the resulting crushing of the fruit.

Another important object is to provide for more vigorous scrubbing of the fruit than has been formerly attained by prior known machines of this type.

This scrubber is especially serviceable in cleaning fruit that has been sprayed.

Other objects and advantages will appear in the subjoined detailed description.

The accompanying drawings illustrate the invention.

Figure 1 is a plan view of a fruit scrubber constructed in accordance with the provisions of this invention.

Figure 5 is an enlarged fragmental detail of a portion of the left end of Figure 1.

Figure 6 is an enlarged fragmental detail of a portion of the right end of Figure 1.

Figure 7 is a fragmental sectional elevation on the line indicated by 7—7, Figure 1.

Figure 8 is an enlarged fragmental section on the line indicated by 8—8, Figure 5.

Figure 2:
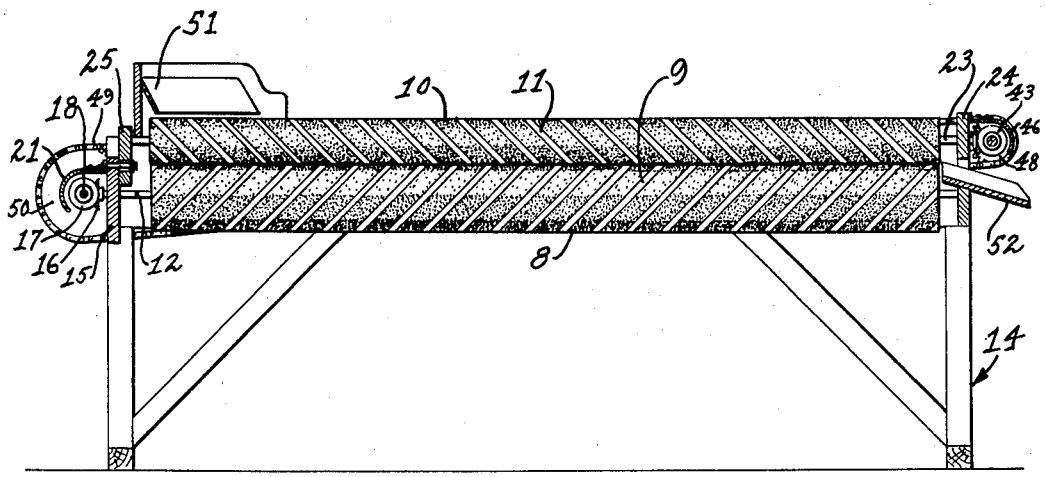
Figure 2 is a sectional view on the line indicated by 2—2, Figure 1.
Figures 3, 4:
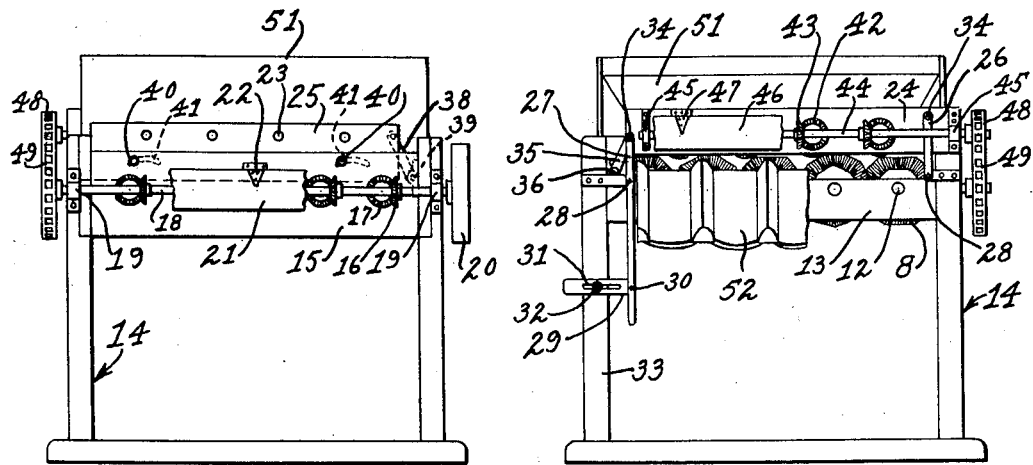
Figure 3 is an end elevation from the left of Figure 1, portions of one of the gear guards being broken away.
Figure 4 is an end elevation from the right of Figure 1, portions of one of the gear guards and discharge chute being broken away.

Fruit scrubbers have heretofore been constructed having a plurality of brushes similar to those indicated at 8, the axes of said brushes lying in a common horizontal plane. The old type of brush was provided with spiral grooves as are also the brushes 8, as indicated at 9. The brushes 8 are sufficiently close to one another to support the fruit. These brushes in the scrubbers of former construction, when rotating, caused the fruit resting thereon to rotate and to be carried from end to end of the brushes. However, only the weight of the fruit was relied upon for holding it in contact with the brushes and, accordingly, the fruit would bounce or vibrate more or less on the brushes and jump from the spiral grooves, thus entailing a slower speed of the fruit from end to end of the brushes than would be the theoretical speed of the fruit if it were advanced by the spiral grooves in the brushes without jumping from said grooves. Besides, this, the fruit would jump over the brushes until all of it was piled up at one side of the scrubber, causing considerable damage to the fruit and generally crushing a considerable portion of it into a pulpy mass. The slower speed of the fruit through the scrubber was a disadvantage even though its slower passage may have insured more thorough cleansing of the fruit, before discharging from the scrubber. From this it will be seen that, even when the fruit was thoroughly cleaned, the output of the old type of scrubbers was necessarily limited by the fact that the fruit moved from end to end of the brushes at a slower rate than its theoretical speed based on its constant engagement with the spiral grooves in the brushes.

I have increased the capacity of the machine and prevent the injurious piling up of the fruit by providing rolls 10 above the brushes 8. The rolls 10 may, if desired, be spaced sufficiently from the brushes 8 as to only engage the fruit when said fruit jumps free of the brushes 8. When the fruit being cleansed requires a relatively small amount of brushing the above mentioned spacing may be adhered to.

The distance between the axis of each roll and the axis of the nearest brush is less than the distance between the axis of said roll and the axis of the next closest brush. This enables the fruit to be discharged into the spaces between the rolls and the brushes from above. It will thus be clearly understood that a number of fruit bodies can be simultaneously discharged into each space. Furthermore, by this construction, the fruit is enabled to move to some extent transversely with respect to the brushes so that the brushing action on said fruit will be enhanced.

The rolls 10 preferably have resilient faces and, in this instance, are in the form of brushes. The rolls 10, preferably, are provided with spiral grooves 11. In the instance shown in the drawings the brushes 8 are octagonal in cross section and the rolls 10 circular, but it is to be understood that the shapes of the brushes and rolls may be otherwise, as desired.

The brushes 8 and rolls 10 may be mounted in any suitable manner and driven by any desired means. The construction that I employ at present for mounting and driving the brushes 8 and rolls 10 is as follows: The shafts 12 of the brushes 8 turn at one end in a cross member 13 of a frame which is indicated, in general, by the character 14, and said shafts turn at their opposite ends in another cross member 15 of said frame. The shafts 12 are provided at one end with bevel gears 16 in mesh with bevel gears 17 on a shaft 18 which extends transversely of the frame 14 and which turns in bearings 19 secured to said frame. The shaft 18 is provided at one end with a driving pulley 20. A curved gear guard 21 preferably extends at least part way around the gears 17 and is connected by hinges 22 to the cross member 15.

The rolls 10 are preferably adjustably mounted for movement toward and from the brushes 8, in order that said rolls can be properly spaced from the brushes 8 for different sizes of fruit and, what is extremely important, to bring more or less pressure to bear against the fruit. By adjusting the brushes 10 sufficiently close to the brushes 8, each fruit body will not only be engaged by adjacent brushes 8, but also by one of the brushes 10 which functions to press the fruit against the brushes 8, thus increasing the pressure between the fruit and all of the brushes that engage said fruit over what the pressure is when only the weight of the fruit is relied upon to hold it in contact with the brushes. Thus, fruit that requires it, can be given a relatively severe brushing or scrubbing in order to cleanse it. As an example of fruit that may be advantageously subjected to brushing under pressure may be mentioned apples that have adhering to them certain insecticides that have been sprayed upon them. An insecticide that is very difficult to remove is arsenate of lead used for spraying apples. To accomplish this, the shafts 23 of the rolls 10 at one end turn in a cross member 24 and at their other ends turn in a cross member 25. The cross members 24, 25 are movably mounted and, in this instance, are mounted for arcuate movement. The cross member 24 is supported by arms 26, 27 which are pivoted thereto at 34 and pivotally mounted at 28 on the frame 14. The arm 27 is longer than the arm 26 and is adjustably held near its lower end by any suitable means, such means, in this instance, comprising a link 29 pivoted at 30 to the arm 27. The link 29 is provided with a longitudinally extending slot 31 through which extends a bolt or set screw 32 in one of the legs 33 of the frame 14. Pivoted at 34 to the upper end of the arm 27 is a crank arm 35 on a rock shaft 36 which extends longitudinally of the frame 14, said rock shaft turning in bearings 37 secured to the frame. Another crank arm 38 on the shaft 36 is pivoted at 39 near one end of the cross member 25. The cross member 25 is movably supported by bolts 40 which project from the cross member 15 through arcuate slots 41 provided in the cross member 25. On said bolts 40 are pipe spacers 411. The curve of the slots 41 is such as to give approximately the same curved path of movement to the left end of the shafts 23 as is given to the right end of said shafts when the cross member 24 is moved on the arms 26, 27.

From the foregoing it will be readily understood that adjustment of the rolls 10 toward and from the brushes 8 will be effected by loosening the bolt 32 and moving the arm 27 into the desired position, and that thereupon the bolt 32 will be tightened to hold the arm 27, and the parts controlled by said arm, in the adjusted position. The shafts 23 are provided at one end with bevel gears 42 which mesh with bevel gears 43 on a shaft 44 that extends transversely of the frame 14. The shaft 44 turns in bearings 45 mounted on the outer face of the cross member 24. Thus, when the cross member 24 is adjusted to different positions, the shaft 44 and gears 42, 43 move with said cross member. A gear guard 46 extends at least part way around the gears 43 and is hinged at 47 to the outer face of the cross member 24.

Turning of the shaft 44 is effected by a sprocket 48 mounted on the shaft 44 and driven by a sprocket chain 49 which, in turn, is driven by a sprocket 50 mounted on the shaft 18. A feed chute 51 is provided at the feed end of the frame and at its discharge end said frame is provided with a discharge chute 52.

Assuming that the pulley 20 is being turned by power from a prime mover and that the rolls 10 have been suitably adjusted for the size of fruit that is to be run through the scrubber, the invention operates as follows:

The fruit will be placed in the chute 51 and will pass between adjacent rolls 10 and drop upon the brushes 8. As indicated by the arrows in Figure 7, the brushes 8 and rolls 10 turn in the same direction, thus the brushes and rolls cooperate to turn the fruit counter-clockwise in Figure 7, the brushes and rolls themselves turning clockwise. Considering, for example, the two brushes 8 at the right of Figure 7 and the roll 10 above said two brushes, it is clear that the left one of said brushes tends to drive the fruit toward the right one of said brushes and that the roll 10 tends to move the fruit toward the left brush. Preferably the rolls 10 rotate at a periphery speed different from that of the brushes 8 and the driving connections may be properly constructed to produce this result, though this is not vitally necessary.

This invention will thoroughly clean apples heavily coated with spray deposit and, when dry brushing is desired, the bristles of the brushes will be of horsehair. When washing of the fruit is desired, the bristles of the brushes may be made of vegetable fibre.

The brushing is sufficiently thorough to perfectly clean the stems and calyx of fruit such, for example, as apples by reason of the fruit being forcibly held against the brushes and due to the rapid rotation of the fruit in all directions, insuring that all portions of the surface of the fruit are presented to the brushes.

It is to be noted that the slot 31 in the link 29 is of sufficient length to permit of each of the brushes 10 being adjusted to a position with its axis in vertical alinement with the axis of one of the brushes 8 and to permit of each of said brushes 10 being adjusted to a position with its axis offset from such vertical alinement toward the next adjacent brush 8 that lies farther than does the brush 10 from that side of the scrubber toward which the upper sides of the brushes 8, 10 rotate. In adjusting the brushes 10 from the first position mentioned above to the second position, each of said brushes 10 moves in an arc and thus approaches closer to the next adjacent brush 8 that lies farther than does said brush 10 from that side of the scrubber toward which the upper sides of the brushes 8, 10 rotate. Thus, the pressure upon the fruit can be regulated to a nicety, or the brushes 10 can be positioned so as to simply function as guards to prevent the fruit jumping over the brushes 8 in a direction that, if the jumping were not prevented, would cause the fruit, eventually, to pile up at one side of the scrubber. The tendency to jumping is greatly increased if feeding of the fruit to the scrubber be accelerated sufficiently to cause the fruit bodies to touch and crowd upon one another.

I claim:

1. A fruit scrubber comprising rotatably mounted brushes positioned sufficiently close together to support the fruit, means to rotate the brushes, a roll rotatably mounted above said brushes in position to engage fruit on the brushes, the distance between the axes of the roll and nearest brush being less than the distance between the axes of the roll and next closest brush, and means to rotate the roll in the same direction as the brushes.

2. A fruit scrubber comprising rotatably mounted brushes positioned sufficiently close together to support the fruit, means to rotate the brushes, a roll provided with a resilient peripheral portion and rotatably mounted above said brushes in position to engage fruit on the brushes, the distance between the axes of the roll and nearest brush being less than the distance between the axes of the roll and next closest brush and means to rotate the roll in the same direction as the brushes.

3. A fruit scrubber comprising rotatably mounted brushes positioned sufficiently close together to support the fruit, a brush rotatably mounted above the first mentioned brushes in position to engage fruit on said first mentioned brushes, the distance between the axes of the upper brush and nearest lower brush being less than the distance between the axes of said upper brush and next closest lower brush, and means to rotate the brushes in the same direction.

4. A fruit scrubber comprising rotatably mounted brushes positioned sufficiently close together to support the fruit, means to rotate the brushes, a roll rotatably mounted above said brushes in position to engage fruit on the brushes, the distance between the axes of the roll and nearest brush being less than the distance between the axes of the roll and next closest brush, and means to rotate the roll in the same direction as and at a different peripheral speed than the brushes.

5. A fruit scrubber comprising rotatably mounted brushes positioned sufficiently close together to support the fruit, means to rotate the brushes, movably mounted cross members, means to hold the cross members in different positions, a roll rotatably mounted on said cross members in position to engage fruit on the brushes, the distance between the axes of the roll and nearest brush being less than the distance between the axes of the roll and next closest brush, and means to rotate the roll in the same direction as the brushes.

6. A fruit scrubber comprising rotatably mounted brushes positioned sufficiently close together to support the fruit, means to rotate the brushes, cross members, means to hold the cross members in different positions along an arcuate path, a roll rotatably mounted on said cross members in position to engage fruit on the brushes, the distance between the axes of the roll and nearest brush being less than the distance between the axes of the roll and next closest brush, and means to rotate the roll in the same direction as the brushes.

7. A fruit scrubber comprising rotatably mounted brushes positioned sufficiently close together to support the fruit, means to rotate the brushes, a roll rotatably mounted above said brushes in position to engage the fruit on the brushes, means to rotate the roll, and means to adjust the roll around the axis of one of the brushes toward and from the axis of the next adjacent brush.

Signed at Los Angeles, Calif., this 22 day of January, 1927.

FRED STEBLER.